United States Patent [19]

Owada et al.

[11] Patent Number: 4,989,076
[45] Date of Patent: Jan. 29, 1991

[54] VIDEO PROJECTION APPARATUS

[75] Inventors: Mitsuru Owada, Kanagawa; Mizuho Tajima, Tokyo; Yoshitake Nagashima, Kanagawa, all of Japan

[73] Assignee: Canon Kabushiki Kaisha, Tokyo, Japan

[21] Appl. No.: 147,519

[22] Filed: Jan. 25, 1988

[30] Foreign Application Priority Data

Jan. 27, 1987 [JP] Japan .................. 62-017830
Jan. 27, 1987 [JP] Japan .................. 62-017831
Jan. 27, 1987 [JP] Japan .................. 62-015291

[51] Int. Cl.$^5$ .............................. H04N 9/31
[52] U.S. Cl. ......................... 358/61; 340/784; 350/337; 350/338; 350/401; 350/403; 350/408; 353/31; 353/34
[58] Field of Search ............... 358/60, 61, 232, 236; 340/784; 350/337, 338, 345, 401, 403, 408; 353/31, 34

[56] References Cited

U.S. PATENT DOCUMENTS

| | | | |
|---|---|---|---|
| 4,127,322 | 11/1978 | Jacobson et al. | 358/61 |
| 4,191,456 | 3/1980 | Hong et al. | 358/61 |
| 4,425,028 | 1/1984 | Gagnon et al. | 358/61 |
| 4,755,869 | 7/1988 | Tanaka | 358/60 |
| 4,786,146 | 11/1988 | Ledebuhr | 350/331 R |
| 4,796,978 | 1/1989 | Tanaka et al. | 350/337 |
| 4,864,390 | 9/1989 | McKechnie et al. | 358/60 |

Primary Examiner—Howard W. Britton
Attorney, Agent, or Firm—Fitzpatrick, Cella, Harper & Scinto

[57] ABSTRACT

An apparatus for receiving the illumination light from an illumination light souce and for providing a color image on a projection lens includes three displays responsive to a video signal for modulating incident light to display respective component images. Also included are a first dichroic layer for separating the illumination light into a first light component and a first mixed light of different wavelengths to transmit the first light component to one of the displays, a second dichroic layer for separating the mixed light into second and third light component of different wavelengths to transmit the second and third light component to the other two of the displays, respectively, a third dichroic layer for combining the first and second information lights from the first two displays, and a fourth dichroic layer for further combining the information light combined by the third dichroic layer with a third information light from the third display.

15 Claims, 4 Drawing Sheets

VIDEO PROJECTION APPARATUS

BACKGROUND OF THE INVENTION

1. Field of the Invention

This invention relates to a liquid crystal display (hereinafter abbreviated to LCD) projection apparatus in which a video signal formed from the entering white light is separated into chrominance components of three primary colors, and then the components after having been modulated by using respective monochrome video image display devices such as LCD ones are synthesized again to permit projection of an image in full color.

2. Description of the Related Art

Figure 1:
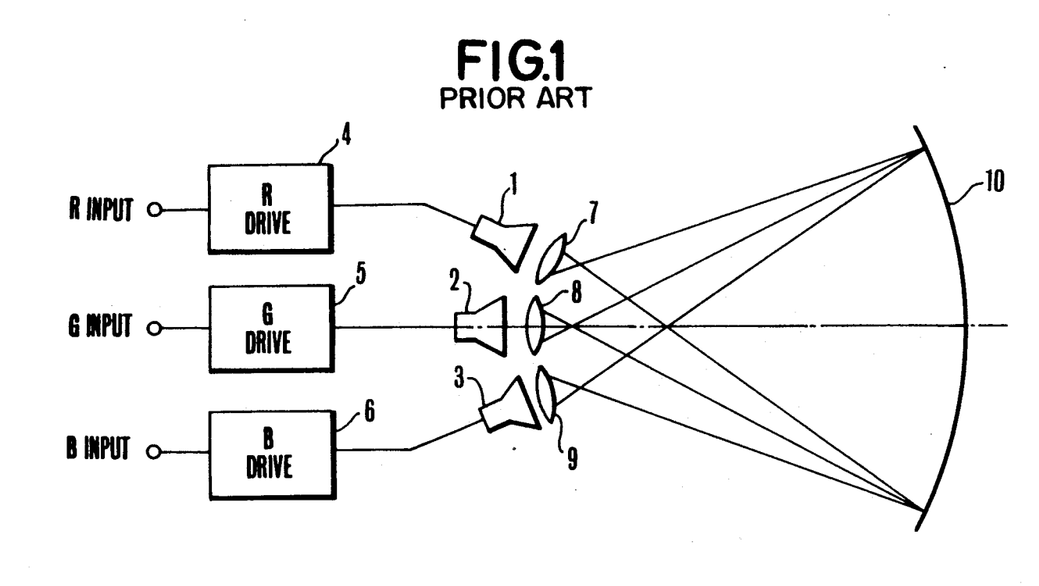
FIG. 1 is a diagram of arrangement illustrating a conventional example.

Recently, television sets of the projection type have rapidly come into such wide use that they can be seen not only in the public facilities but also in homes. This kind of apparatus uses three high-luminance cathode ray tubes in which are made up color component images corresponding to the respective color component lights of red (R), green (G) and blue (B) and these images are projected by projection lenses onto a screen where they are synthesized to display a picture of the original color. FIG. 1 shows the outline of the video projection apparatus. 1, 2 and 3 are cathode ray tubes corresponding to the color components R, G and B respectively and are driven by drive circuits 4, 5 and 6 for R, G and B into which the video signals of the color components R, G, B enter respectively. 7, 8 and 9 are projection lenses, and are each arranged in focus on a screen 10 in front of the cathode ray tubes 7, 8 and 9. Note, in this figure, the projection lens is shown by a single lens, but in actual practice is usually constructed with a plurality of lenses for correction of various aberrations.

However, such an apparatus increases in size, and, when the distance to the screen is changed, re-adjustment is required so that the three monochrome projected images overlap one another on the screen.

Figure 2:
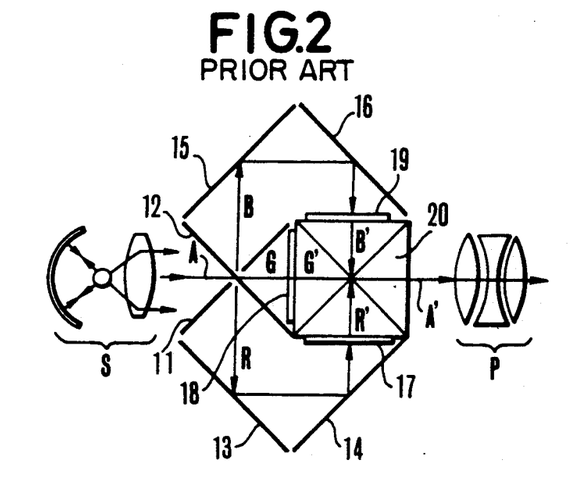
FIG. 2 is an optical section view of a projection apparatus.

Therefore, as an arrangement for the possibility of projecting by one projection lens P, what is shown in FIG. 2 is considered. In the figure, S is an illumination light source issuing white light, for example, for use in the Koehler illumination system in use. As means for separating parallel entering light A which is white light into three primary colors, use is made of dichroic mirrors 11 and 12 having two dichroic layers of different wavelength regions crossed to each other. For example, the dichroic mirror 11 reflects the blue color component B, and the dichroic mirror 12 reflects the red color component R. Of the three color components R, G and B separated by this crossed dichroic mirrors 11 and 12, the color component R is reflected by total reflection mirrors 13 and 14, the color component G goes straight as it is, and the color component B is reflected by total reflection mirror 15 and 16, entering LCDs 17, 18 and 19 corresponding to the respective ones. Because in the LCDs 17, 18 and 19, pictures of each color component of red, green and blue are imaged out, when light permeates here, the variation of transmittance due to the pictures of each of the LCDs 17, 18 and 19 is modulated to the variation of intensity of light.

Figure 3:
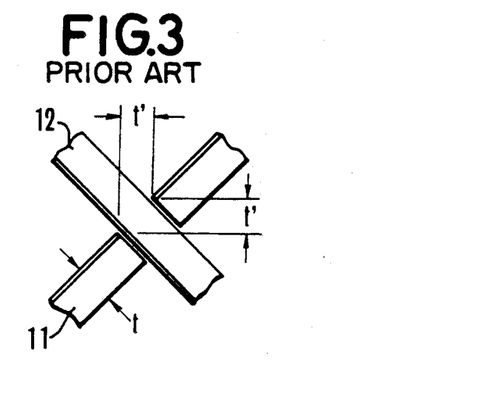
FIG. 3 is a view in enlarged scale of a portion of FIG. 2.

That is, in FIG. 2, color components R, G and B of red, green and blue are modulated by the video signals of the LCDs 17, 18 and 19, respectively, becoming color components (color information light) R', G' and B'. These lights are synthesized again by a dichroic prism 20 to produce an exiting light A'. Note, the exiting light A' is, as known in the art, projected by the projection lens P onto the screen. On the screen, a picture of full color comes out. In such a manner, in the prior known apparatus, the two dichroic mirrors 11 and 12 are used in the crossed state. Therefore, a portion of the reflection surface of one dichroic mirror 11 is stripped off, giving a drawback that the picture is partly broken down. For example, in FIG. 3, on assumption that the dichroic mirrors 11 and 12 cross each other at right angles, the relationship between the thickness t of the dichroic mirror and the size t' of the broken portion of the reflection surface is expressed by the following equation:

$$t' = t/2^{0.5} \tag{1}$$

The value of t' of this equation (1) cannot be ignored, and a problem arises that by that portion alone, the center of, for example, the blue is broken down to a stripe shape. Also, the dichroic prism 20 used for synthesizing the modulated color components in FIG. 2 is very high in price, and its weight is also large, being unsuited to be used in home. Further, the optical path from the entering light A to the exiting light A' differs from color component to component. Therefore, the problem of aberration etc. also is large.

SUMMARY OF THE INVENTION

An object of the invention is to provide a projection apparatus in which, by improving such drawbacks of the conventional example, it is made possible that only the dichroic mirrors even separate and synthesize light, and particularly by using such an arrangement that the dichroic mirrors do not cross each other, the problem of the image fracture is eliminated, and, moreover, the optical paths of all the color components can be equalized to each other.

DETAILED DESCRIPTION OF THE PREFERRED EMBODIMENTS

Figure 4:
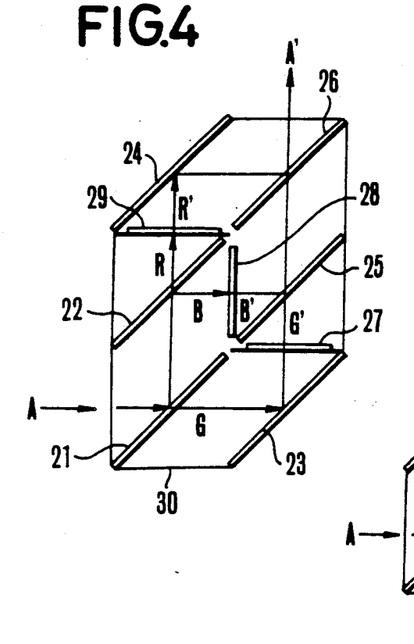
FIG. 4 is an optical section view illustrating an embodiment of the invention.

The present invention is described in detail on the basis of an embodiment shown in FIG. 4. In the figure, the illustration of the illumination light source S and the projection lens P is omitted.

In FIG. 4, 21 is a first dichroic mirror for spectral light separation reflecting, for example, red and blue color components R and B. A second dichroic mirror 22 for spectral light separation separates such reflected color components R and B. As the second dichroic mirror 22, use is made of the property of reflecting the blue color component B. The first and second dichroic mirrors 21 and 22 for spectral light separation are arranged parallel in a direction of 45° with the incident light A. On both sides of the dichroic mirrors 21 and 22 for spectral light separation are arranged total reflection mirrors 23 and 24 in parallel with the dichroic mirrors 21 and 22. Also, in the directions of prolongation of the first and second dichroic mirrors 21 and 22 for spectral light separation, there are arranged respectively a first dichroic mirror 25 for synthesis to reflect the blue color component B and a second dichroic mirror 26 for synthesis to reflect the red color component R. An LCD 27 is arranged between the total reflection mirror 23 and the first synthesizing dichroic mirror 25 in a direction parallel to the incident light A, and another LCD 28 is arranged between the first and second spectral separation dichroic mirrors 21 and 22 in a direction perpendicular to the incident light A. Yet another LCD 29 is arranged between the second spectral separation dichroic mirror 22 and the total reflection mirror 24 in a direction parallel to the incident light A. 30 is a framework supporting each constituent part.

The incident light A impinges on the first spectral separation dichroic mirror 21. The green color component G passed here is reflected by the total reflection mirror 23 and then enters the LCD 27. The blue color component B reflected from the first spectral separation dichroic mirror 21 and then from the second spectral separation dichroic mirror 22 enters the LCD 28, and the red color component R passed through the second spectral separation dichroic mirror 22 enters the LCD 29. The LCDs 27, 28 and 29 have images corresponding to the green, blue and red color components G, B and R, respectively. These images depend on the variations of transmittance of the LCDs 27, 28 and 29, and the respective color components G, B and R are modulated to the variation of intensity of light, becoming color components (color information light) G', B' and R'. These modulated color components G', B' and R' are synthesized again and projected as an exiting light A' of full color on the screen. Therefore, all the color components have the same optical length.

In the illustrated case, the green color component G' modulated by the LCD 27 is produced through the first and second synthesizing dichroic mirrors 25 and 26. Also, the blue color component B' modulated by the LCD 28 is reflected by the first synthesizing dichroic mirror 25 to combine with the green color component G'. Further, the red color component R' modulated by the LCD 29 after having been reflected from the total reflection mirror 24 is reflected by the second synthesizing dichroic mirror 26 where it is combined with the green and blue color components G' and B' to become the exiting light A'.

Figure 5:
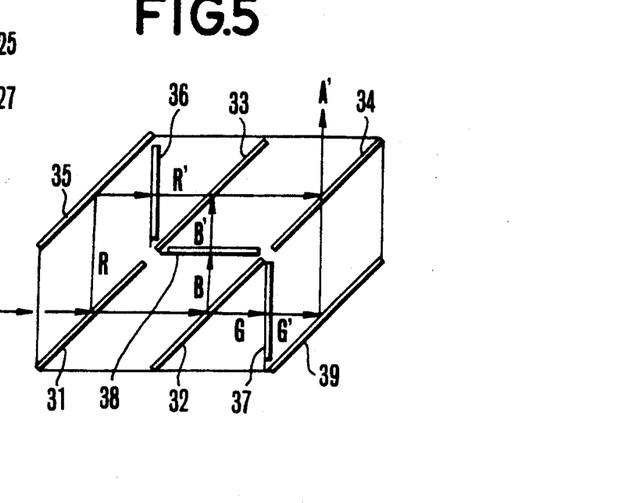
FIG. 5 is an optical section view illustrating another embodiment.

In the second embodiment shown in FIG. 5, the first and second spectral separation dichroic mirrors 31 and 32 are superimposed in a direction of 45 degrees with the incident light A. On the prolongation of these are arranged the synthesizing dichroic mirrors 33 and 34. In the first spectral separation dichroic mirror 31, one reflecting the red color component R is used. Further, as the second spectral separation dichroic mirror 32 for separating the green and blue color components passed through the first spectral separation dichroic mirror 31, use is made of one reflecting the blue color component B. The red color component R enters the LCD 36 passed the total reflection mirror 35, and the green and blue color components G and B separated by the spectral separation dichroic mirror 32 enter the LCDs 37 and 38 respectively. Also, in the first synthesizing dichroic mirror 33 for synthesizing the color components R' and B' modulated by the LCDs 36 and 38, one having the property of reflecting blue is used. Further, in the second synthesizing dichroic mirror 34 for synthesizing the green color component G', one having the property of reflecting the red and blue color components is used. Note, the green color component G' modulated by the LCD 37 is reflected from the total reflection mirror 39 and then passes through the second synthesizing dichroic mirror 34 and then, as has been described above, is synthesized with the color components R' and B' to become the exiting light A' of full color.

In each embodiment described above, for example, the red and blue optical paths may be reversed. In this case, if each dichroic mirror and LCD are so properly chosen as to suit the respective color components, various combinations are possible.

Figure 6:
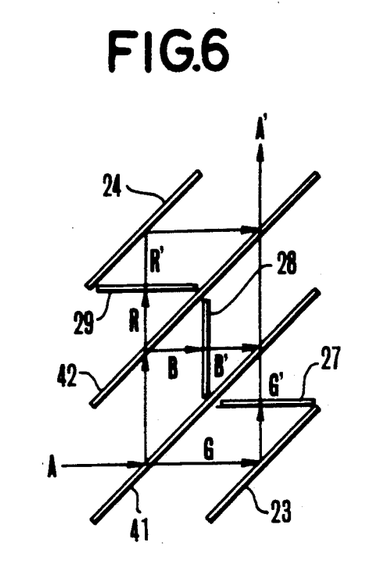
FIG. 6 is an optical section view illustrating an example of variation of the embodiment of FIG. 4.

FIG. 6 shows the structure of another LCD projection apparatus. Here, a first composite dichroic mirror 41 is obtained by unifying the first spectral separation dichroic mirror 21 and the first synthesizing dichroic mirror 25 which position themselves in the same plane in FIG. 4, and a second composite dichroic mirror 42 is obtained by unifying the second spectral separation dichroic mirror 22 and the second synthesizing dichroic mirror 26 which position themselves in the same plane in FIG. 4. All the other constituent elements are like those of FIG. 4, and are denoted by the same reference characters.

Figure 7:
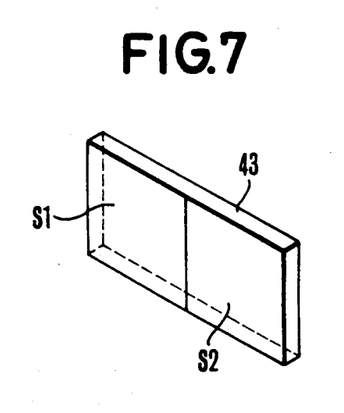
FIG. 7 is a perspective view illustrating one constituent part.
Figure 8:
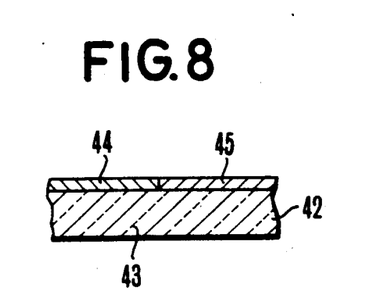
FIG. 8 and FIG. 9 are respectively enlarged views of the main parts.
Figure 9:
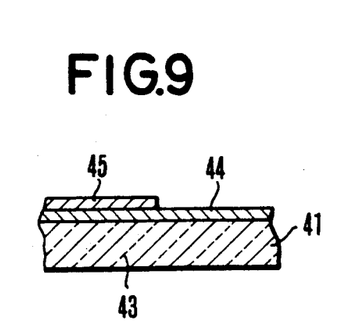

The first and second composite dichroic mirrors 41 and 42 are, for example, as shown in FIG. 7, formed on a common glass substrate 43 in separation at the left-hand half S1 and the right-hand half S2 with coatings of different properties from each other. For example, in the case of the second composite dichroic mirror 42, as shown in FIG. 8, a reflection coating 44 for reflecting a blue component is applied on the left half on the common glass substrate 43, and a reflection coating 45 for reflecting a red component on the right half so that the left half constitutes a dichroic mirror which reflects blue, and the right half another dichroic mirror which reflects red. Also, in the case of the first composite dichroic mirror 41, as shown in FIG. 9, after the coating 44 for reflecting blue has been applied over the entire area of the glass substrate 43, and then the coating 45 for reflecting red is applied only to the left half in superimposed relation. Thus, a dichroic mirror which reflects blue is formed in the right half, and another dichroic mirror which reflects blue and red is formed in the left half.

In other words, the first composite dichroic mirror 41 has both functions of the first spectral separation and the first synthesizing dichroic mirrors 21 and 25 of FIG. 4, and the second composite dichroic mirror 42 has both functions of the second spectral separation and the second synthesizing dichroic mirrors 22 and 26 of FIG. 4. Therefore, the operational principle becomes the same as that of FIG. 4.

That is even in FIG. 6, the incident light A on the left half of the first composite dichroic mirror 41 reflects the red color component R and the blue color component B, while the green color component G goes straight as it is and enters the LCD 27 through the total reflection mirror 23. Also, of the red and blue color components reflected by the left half of the first composite dichroic mirror 41, the blue color component B is reflected by the left half of the second composite dichroic mirror 42 and enters the LCD 28. The red color component R goes straight as it is and enters the LCD 29. Of the entering and modulated color components G', B' and R' which enter and are modulated by the LCDs 27, 28 and 29, the color component G' passes through the right half of the first composite dichroic mirror 41, and the right half of the second composite dichroic mirror 42. When passing through the first composite dichroic mirror 41, it is synthesized with the blue color component B', and further when passing through the second composite dichroic mirror 42, it is synthesized with the red color component R' coming from the total reflection mirror 24. The three color components G', B' and R are synthesized to become an exiting light A' of full color which is then projected by the projection lens onto the screen.

In the above-described embodiment, the characteristics concerning red and blue of the dichroic mirror may be exchanged by each other, of course.

As has been described above, in the LCD projection apparatus according to this embodiment, whilst in the embodiment of FIG. 4, the necessary number of dichroic mirrors of high price is 4, only two can suffice. Therefore, the cost can largely be cut down. Also, when assembling, because the only necessary operation is to adjust the position of the two dichroic mirrors, the adjustment is easy and the number of steps in the assembling process can be reduced. Further, because of the decrease of the positioning factor, there is another advantage that the quality is stable and the difference of the items can be lessened.

Figure 10:
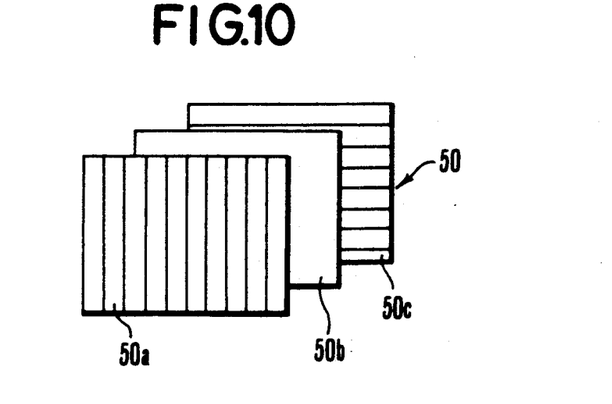
FIG. 10 is an exploded perspective view of a liquid crystal display device.

By the way, the liquid crystal display 50 is constructed, as shown in FIG. 10, from a polarizer 50a, a liquid crystal layer 50b and an analyzer 50c. At the polarizer 50a, only the vertical component (linearly polarized light) of the incident white light is permitted to pass through, while the parallel component is absorbed or reflected. This vertical component is rotated 90° in passing through the liquid crystal layer 50b so that it can pass through the analyzer 50c orthogonal to the polarizer 50a. About a half of the white light after having been modulated by the liquid crystal display 50 is projected onto a screen (not shown), but the remaining half is shut out by the polarizer 50a. Hence it is impossible to set the efficiency of light utilization at higher than 50%.

Figure 11:
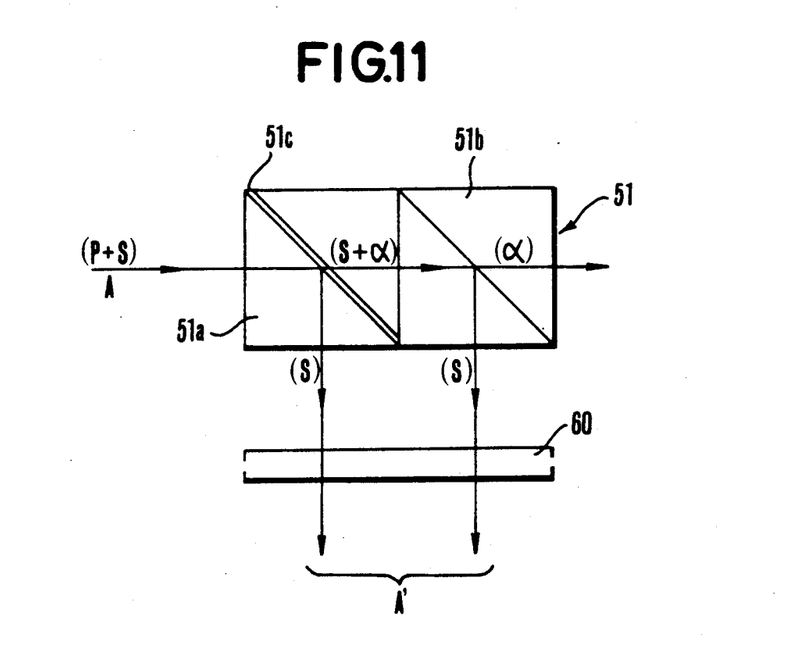
FIG. 11 is a diagram illustrating an example of an illumination device.

FIG. 11 shows an example of an illumination system free from the above-described loss of light amount. 60 is assumed to be the assembly shown in FIG. 4 or FIG. 5, except that the liquid crystal display of this case does not have the polarizer in front of the liquid crystal layer.

51 is a light polarizing assembly which converts white light A from a light source to a linearly polarized light to be used in the color separation-synthesizing assembly 60. This light polarizing assembly 51 is formed from polarizing beam splitters 51a and 51b and a TN (twist nematic) liquid crystal 51c of 90° rotation directly installed in the prism boundary face of the polarizing beam splitter 51a.

In the arrangement described above, the white light A is entered through a condenser lens (not shown) to the polarizing beam splitter 51a, the vertical component S of the white light is reflected by its prism boundary face to enter the color separation-synthesizing assembly 60. Meanwhile, the parallel component P of the white light passes through the prism boundary face, but becomes vertically polarized light by the TN liquid crystal 51c of 90° rotation which constitutes part of the multi-layer coating on the prism boundary face of the polarizing beam splitter 51a. The thus-converted vertical component S is reflected by the next polarizing beam splitter 51b, while a component α generated due to the defect etc. of the TN liquid crystal 51c passes therethrough as it is. This reflected vertical component S is entered into the color separation-synthesizing assembly 60 like the vertical component S reflected by the polarizing beam splitter 51a. Hence, nearly 100% of the incident light is transmitted out of the device. Thus, the efficiency of use of the light rises.

What is claimed is:

1. An apparatus, receiving a polarized light, for providing a color image on a projection lens, comprising:
    (a) first, second and third display device for modulating incident light in response to a video signal to display respective component images;
    (b) a first dichroic layer for separating the polarized light into a first light component and a first mixed light of different wavelength regions from each other and for providing said first light component to said first display device;
    (c) a second dichroic layer for separating said first mixed light into second and third light components of different wavelength regions from each other, and for providing said second and said third light components to said second and third display devices, respectively;
    (d) a third dichroic layer for synthesizing first and second information lights from said first and second display devices; and
    (e) a fourth dichroic layer for further synthesizing the light synthesized by said third dichroic layer with a third information light from said third display device; and
    wherein said first, second, third, and fourth dichroic layers extend parallel to each other, and wherein said first dichroic layer separates the polarized light after it passes through an optical element for rotating a plane of polarization of the polarizing light by 90° and generates a first polarizing beam which does not pass through the optical element and a second polarized beam which passes through the optical element and has a same plane of polarization as the first polarized beam.

2. An apparatus according to claim 1, wherein said first dichroic layer separates out said illumination light into a light component comprising a green light component and first mixed light comprising a red-blue mixed light, and wherein said second dichroic layer separates said red-blue mixed light into second and third light components comprising a red light component and a blue light component.

3. An apparatus according to claim 1, wherein said first dichroic layer separates out said illumination light into a light component comprising a red light component and a first mixed light comprising green-blue mixed light, and wherein said second dichroic layer separates said green-blue mixed light into second and third light components comprising a green light component and a blue light component.

4. An apparatus according to claim 1, wherein said third dichroic layer synthesizes first and second information lights comprising green information light and blue information light, and wherein said fourth dichroic layer synthesizes the light synthesized by said third dichroic layer with the third information light comprising red information light.

5. An apparatus according to claim 1, wherein said third dichroic layer synthesizes first and second information lights comprising red information light and blue information light, and wherein said fourth dichroic layer synthesizes the light synthesized by said third dichroic layer with the third information light comprising green information light.

6. An apparatus according to claim 1, wherein said second display device is positioned between said second and third dichroic layers.

7. An apparatus according to claim 1, further comprising first and second mirrors, wherein said first mirror reflects the first light component separated by said first dichroic layer toward said first display device, wherein said first display device is positioned between said first mirror and said third dichroic layer, wherein said second mirror reflects said third light component separated by said second dichroic layer toward said fourth dichroic layer, and wherein said third display device is positioned between said second dichroic layer and said second mirror.

8. An apparatus according to claim 1, further comprising:
(f) a first substrate supporting said first and said third dichroic layers; and
(g) a second substrate supporting said second and said fourth dichroic layers.

9. An apparatus according to claim 2, wherein the two kinds of dichroic layers on said substrate are provided in partition.

10. An apparatus according to claim 2, wherein the two kinds of dichroic layers on said substrate are provided in partly superimposed relation.

11. An apparatus for providing a color image on a projection lens, comprising:
(a) an illumination device for generating illumination light which passes through a polarizing beam splitter to provide a polarized beam, said beam splitter having an optical element for rotating a plane of polarization of the polarizing beam by 90° and generating a first polarizing beam which does not pass through said optical element and a second polarizing beam which passes through said optical element and has a same plane of polarization as said first polarizing beam;
(b) three display devices for modulating said illumination light incident thereon in response to a video signal to display respective component images, wherein said display devices are liquid crystal displays each having no polarizer;
(c) component light forming means, comprising dichroic layers, for receiving said illumination light, wherein said dichroic layers are of different wavelength separation characteristics for successively separating said illumination light into red, blue and green components, and for providing said red, blue, and green components to said three display devices respectively, wherein said dichroic layers extend parallel to each other; and
(d) information light synthesizing means for conducting information lights of red, blue and green from aid display devices successively to dichroic layers of different wavelength separation characteristics to synthesize said red, blue, and green information lights.

12. An apparatus according to claim 11, wherein said component light forming means separates the illumination light incident thereon into a reflected light and a transmitted light by a first dichroic layer, and further separates one of the reflected light and the transmitted light into a reflected light and a transmitted light by a second dichroic layer.

13. An apparatus according to claim 11, wherein said information light synthesizing means synthesizes light transmitted through a third dichroic layer with light reflected from the third dichroic layer, and wherein one of the synthesized light and the remaining information light is reflected and the other of which is transmitted to effect synthesizing.

14. An apparatus according to claim 11, wherein said information light synthesizing means extends parallel to said component light forming means.

15. An apparatus according to claim 11, wherein one of said display devices is positioned between said component light forming means and said information light synthesizing means.

* * * * *

UNITED STATES PATENT AND TRADEMARK OFFICE
CERTIFICATE OF CORRECTION

PATENT NO. : 4,989,076

DATED : January 29, 1991

INVENTOR(S) : Mitsuru Owada, et al.

It is certified that error appears in the above-identified patent and that said Letters Patent is hereby corrected as shown below:

<u>COLUMN 1</u>:

Line 45, "system in use." should read --system.--.

<u>COLUMN 5</u>:

Line 20, "R" should read --$R'$--

<u>COLUMN 6</u>:

Line 22, "device" should read --devices--.

<u>COLUMN 7</u>:

Line 35, "claim 2," should read --Claim 8,--.

Line 38, "claim 2," should read --Claim 8,--.

UNITED STATES PATENT AND TRADEMARK OFFICE
CERTIFICATE OF CORRECTION

PATENT NO. : 4,989,076

DATED : January 29, 1991

INVENTOR(S) : Mitsuru Owada, et al.

It is certified that error appears in the above-identified patent and that said Letters Patent is hereby corrected as shown below:

<u>COLUMN 8</u>:

Line 22, "aid" should read --said--.

Signed and Sealed this

Twenty-seventh Day of October, 1992

*Attest:*

DOUGLAS B. COMER

*Attesting Officer*      *Acting Commissioner of Patents and Trademarks*